United States Patent [19]
Squilla et al.

[11] Patent Number: 6,078,756
[45] Date of Patent: Jun. 20, 2000

[54] PHOTOGRAPHIC AND DATA TRANSMISSION SYSTEM FOR CAPTURING IMAGES AND MAGNETIC DATA

[75] Inventors: John R. Squilla; James D. Allen; Omid A. Moghadam, all of Rochester, N.Y.

[73] Assignee: Eastman Kodak Company, Rochester, N.Y.

[21] Appl. No.: 08/846,436

[22] Filed: Apr. 30, 1997

[51] Int. Cl.$^7$ .............................. G03B 17/00; G03B 17/24
[52] U.S. Cl. ............................................ 396/300; 396/319
[58] Field of Search .................................... 396/297, 300, 396/310, 315, 319, 320, 311, 313, 314, 321

[56] References Cited

U.S. PATENT DOCUMENTS

| | | | |
|---|---|---|---|
| 4,714,962 | 12/1987 | Levine | 358/209 |
| 5,343,267 | 8/1994 | Kazumi | 354/410 |
| 5,376,965 | 12/1994 | Nagasaki et al. | 348/232 |
| 5,625,429 | 4/1997 | Kazami e tal. | 396/300 |
| 5,697,001 | 12/1997 | Ring et al. | 396/121 |
| 5,715,486 | 2/1998 | Kim et al. | 396/299 |
| 5,799,219 | 8/1998 | Moghadam et al. | 396/319 |
| 5,809,520 | 9/1998 | Edwards et al. | 711/115 |
| 5,819,126 | 10/1998 | Kitagawa et al. | 396/319 |
| 5,983,035 | 11/1999 | Funaki | 396/281 |

*Primary Examiner*—Safet Metjahic
*Assistant Examiner*—Christopher Mahoney
*Attorney, Agent, or Firm*—David M. Woods

[57] ABSTRACT

A photographic and data communication system includes a camera used with a magnetic communication system in which information is stored on a magnetic medium external to the camera. The camera includes means for capturing an image, a magnetic read section for reading a magnetic signal from the magnetic medium, and a recording section for storing the magnetic signal in association with the image. More specifically, the camera is capable of receiving digital data through a magnetic recording head and saving received data along with the captured image. In case of a digital camera this extra information is stored in solid state memory on the camera. In case of a camera utilizing a film with magnetic tracks or regions, the received data is stored on the magnetic portion of the film. In case of a camera using regular film, the received information is stored on the camera in solid state memory to be downloaded later on. The invention is described in a tradeshow environment, although its use is not limited to such settings.

8 Claims, 6 Drawing Sheets

PHOTOGRAPHIC AND DATA TRANSMISSION SYSTEM FOR CAPTURING IMAGES AND MAGNETIC DATA

CROSS-REFERENCE TO RELATED APPLICATION(S)

Reference is made to commonly assigned copending applications Ser. No. 08/707,265, entitled "Tradeshow Photographic and Data Transmission System" and filed on Sep. 3, 1996 in the names of James D. Allen, Omid A. Moghadam, and John R. Squilla, which is assigned to the assignee of this application.

FIELD OF THE INVENTION

The invention relates generally to the field of photography, and in general to a photographic system capable of image capture and magnetic data communication and recording.

BACKGROUND OF THE INVENTION

It is known in the art that a film or an electronic camera can record image information on either a film or store the information in electronic memory. It is also known in the art that a wireless transceiver can be used to transmit and receive data. An example of such a device is shown in the copending Ser. No. 08/707,265 and in U.S. Pat. No. 4,957,348. Digital cameras also have the capability of storing additional information along with the digital image. An example of this is the Kodak DCS 460a digital camera, which is capable of storing voice annotation along with the digital image. Moreover, the film used by the Advanced Photo System™, which is sold by the Eastman Kodak Company, allows a film camera to store digital information on a clear magnetic coating on the photographic film. This feature is disclosed in U.S. Pat. No. 5,194,892.

Many participants in tradeshows today take a camera to capture images of the products or booths that they have an interest in. These images are a reminder of the physical characteristics of the product. They are also used at a later time for desktop publishing of compound documents or perhaps for electronic publication of a report. Exhibitors at the show also publish color brochures to be distributed at the show to advertise their products. The cost of printing these brochures has increased in the past few years. A lot of these brochures are thrown away at the end of the show, which decreases their effectiveness as an advertising tool and also adds to the overall cost. Many companies are now posting information about their products to an Internet site, where customers can dial into and download the information they need to a personal computer. Besides needing to obtain Uniform Resource Locator (URL) addresses for the location of these information sites, this also means that the customer needs to go through many pages of information before the needed information is found.

In copending Ser. No. 08/707,265, a photographic and data transmission system is described that includes a wireless communication system and a camera intended for use with the wireless system. The camera includes a receiver for receiving a wireless signal from the wireless communication system, a decoder for decoding the wireless signal obtained by the receiving means, and means for storing the decoded wireless signal and an image captured by the camera. A trigger signal from the camera can be used to initiate transmission of the wireless signal from the wireless communication system. Moreover, the wireless signal preferably contains an Internet address for accessing further information about an item being photographed. Such a camera is of particular use in a tradeshow for conveying information between a wireless communication system in a display booth and a camera brought to the booth by a tradeshow visitor.

A problem with a wireless system is the number of unrelated wireless signals being transmitted at a given time in a given locale, which can lead to interference or to the recording of the wrong wireless signal. It would be desirable to find a convenient way to combine the information handling capability of modern cameras with image recording so that information can easily be accessed about a photographed item without having to depend upon the transmission of wireless signals.

SUMMARY OF THE INVENTION

The present invention is directed to overcoming one or more of the problems set forth above. Briefly summarized, according to one aspect of the present invention, a camera is shown for use with a magnetic communication system in which information is stored on a magnetic medium external to the camera. The camera includes means for capturing an image, a magnetic read section for reading a magnetic signal from the magnetic medium, and a recording section for storing the magnetic signal in association with the image. More specifically, this invention describes a photographic system using a camera capable of receiving digital data through a magnetic recording head and saving received data along with the captured image. In case of a digital camera this extra information is stored in solid state memory on the camera. In case of a camera utilizing a film with magnetic tracks or regions, such as the film used in an Advanced Photographic System™ camera, the received data is stored on the magnetic portion of the film. In case of a camera using regular film, such as 35mm film, the received information is stored on the camera in solid state memory to be downloaded at a later time. The invention is described in a tradeshow environment, although its use is not limited to such settings.

In a tradeshow setting using the photographic system of this invention, information about a product on display such as model, price, manufacturer and web site address are stored in a magnetic strip at the booth in a tradeshow. The user equipped with a camera as described in one of the embodiments of this invention will take a picture of the desired product in the booth and then will swipe the magnetic reader head on the magnetic strip of the booth. The information is transferred to a buffer memory in the camera, where it is saved along with the image.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing film or electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system description as described in the following materials, all such software implementation is conventional and within the ordinary skill in such arts.

Figure 1:
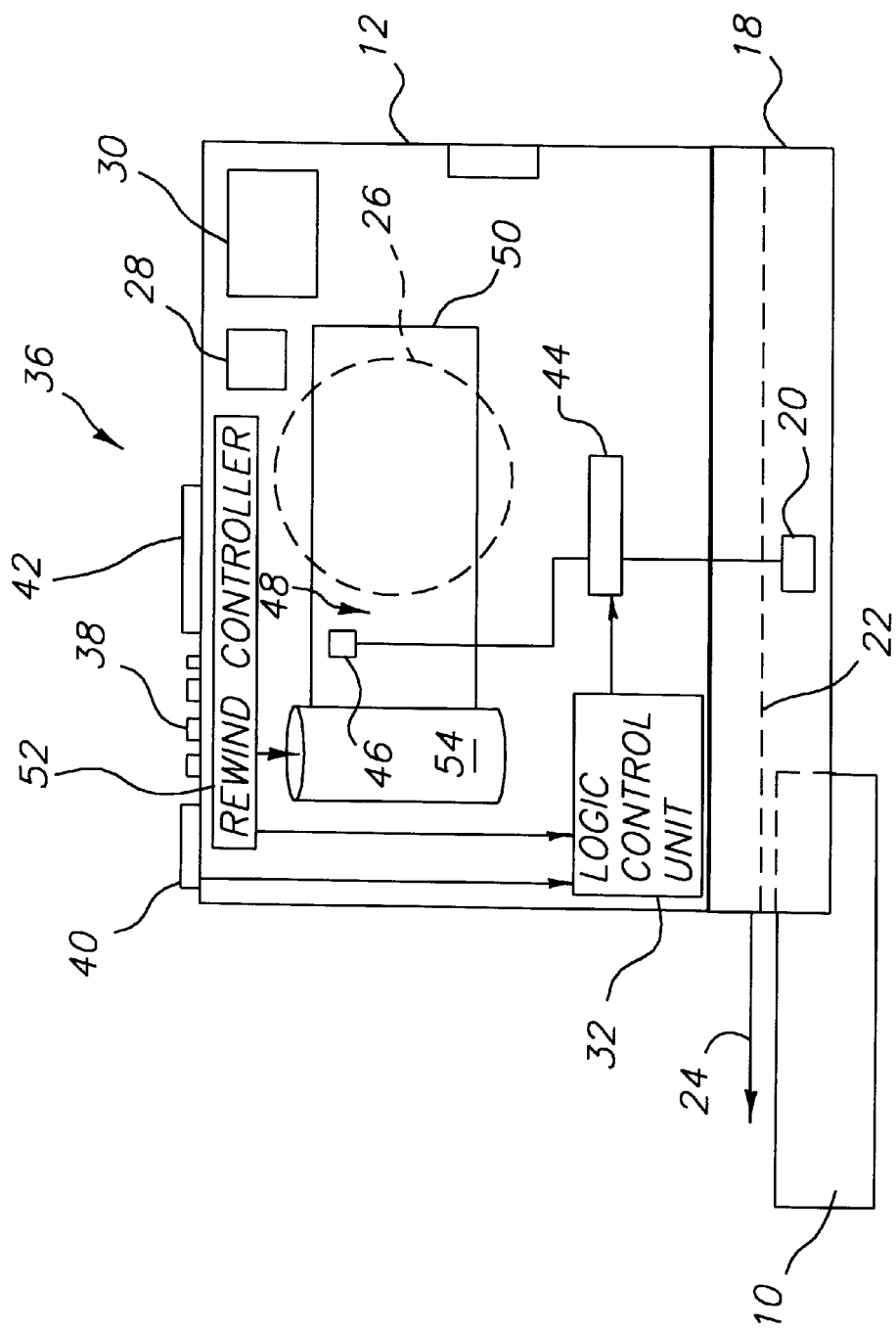
FIG. 1 shows a film camera according to a first embodiment of the invention having an integrated external magnetic reader device for use with a film having a magnetic recording layer.
Figure 2:
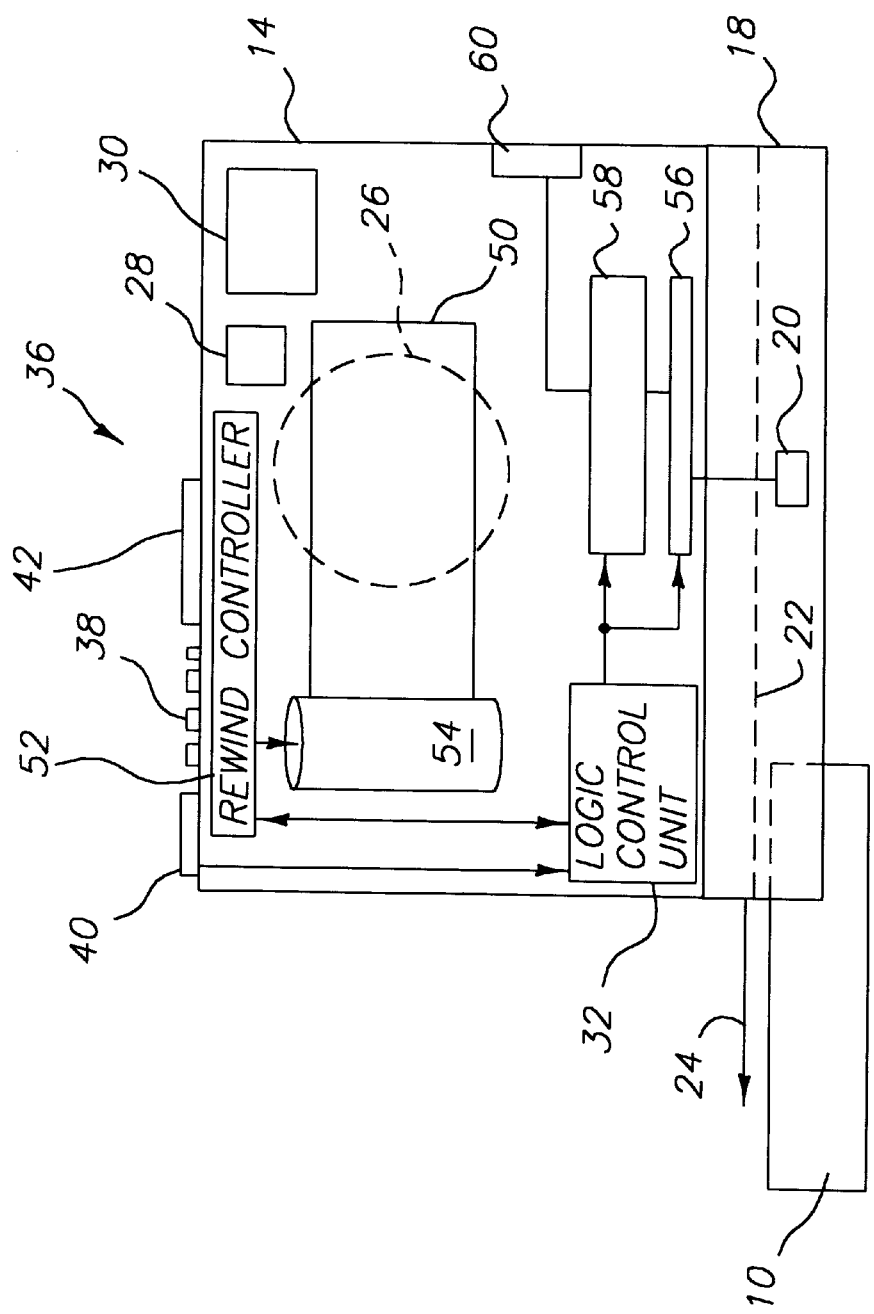
FIG. 2 shows a film camera according to a second embodiment of the invention having an integrated external magnetic reader device for use with standard photographic film.
Figure 3:
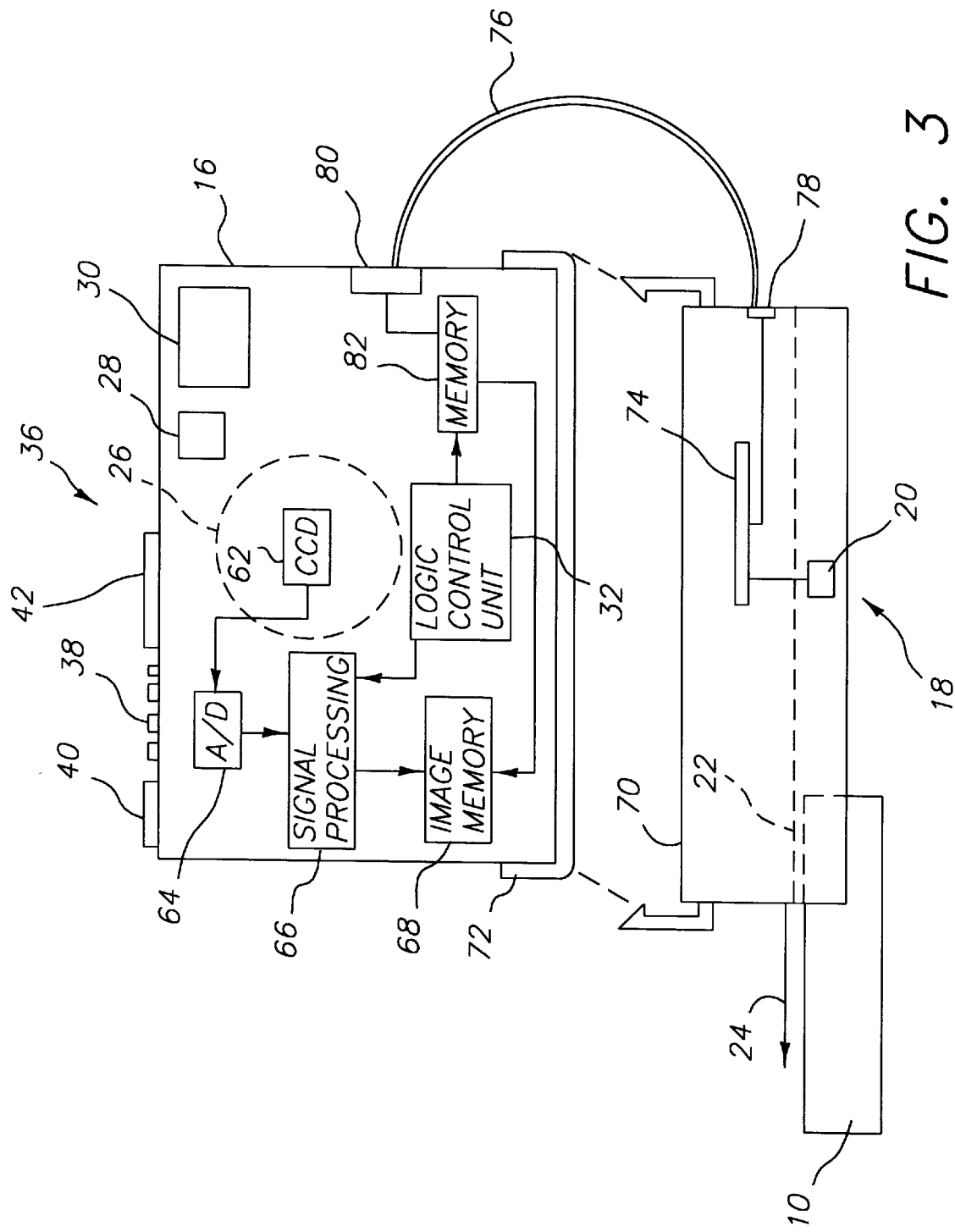
FIG. 3 shows a digital camera according to a third embodiment of the invention having an external (clip-on) magnetic reader device.

Beginning with FIGS. 1, 2, and 3, the photographic system and data transmission system is shown to include two main parts. The first part is a magnetic storage device, for example a magnetic medium such as a magnetic strip 10, installed at a booth at a tradeshow. Information is stored on the magnetic strip 10 about a product on display in the booth. In a tradeshow setting using the photographic system of this invention, the information about the product on display may include the product name, model, company (manufacturer) name, product specifications, details of product performance, the price of the product, and so on.

In particular, the magnetic strip 10 may include the URL web site address of the product catalogue on the Internet system. The other part of the photographic system includes the image capture device, such as the Advanced Photo System™ camera 12 shown in FIG. 1, the conventional photographic camera 14 shown in FIG. 2, and the digital camera 16 shown in FIG. 3. The camera 12, 14, or 16 is brought into the vicinity of the tradeshow booth by a tradeshow visitor. Each camera is capable of receiving information magnetically from the magnetic strip 10 through a magnetic read section 18 located in or attached to the camera.

Preferably, each camera includes a magnetic reading head 20 positioned in a slotted surface 22 for reading a magnetic signal on the magnetic strip 10 when relative motion is established between the magnetic strip 10 and the respective camera. For example, the camera may be moved in the direction of an arrow 24 past a stationary magnetic strip 10 to establish the relative motion. Alternatively, the magnetic strip 10 may be mounted so as to move relative to a stationary camera.

Each camera 12, 14, 16 captures an image of an object through a lens 26, using a viewfinder 28 to frame the object and a flash unit 30 to illuminate the object, as needed. Each camera includes the magnetic read section 18 and a logic control unit 32 for controlling interface with the magnetic strip 10, as well as other camera functions. For each type of camera, the captured image is stored in a recording section (e.g., in the emulsion of a film, a magnetic media, solid state media, etc.), where information identifying the product can also be associated with the image. In particular, the logic control unit 32 receives input instructions from a user input control section 36, which includes user input controls 38, a capture release 40 and a status display 42 that allows user selection of capture features, such as flash on/off, and so forth. For purpose of this invention, the images are taken by the camera 12, 14, 16 after the user has selected a magnetic read feature on the status display 42 by using the user input controls 38 to select an appropriate icon representative of the feature. The user then actuates the capture release 40 and the camera 12, 14, 16 captures the selected picture. Then the user swipes the magnetic read head 20 past the magnetic strip 10, and appropriate product information from the magnetic strip 10 is associated with the image in the recording section.

In the case of an Advanced Photo System™ camera unit 12, as shown in FIG. 1, the data read by the magnetic reading head 20 is stored in a buffer 44 and then output to a magnetic recording head 46 for recording on a magnetic portion 48 of an APS photographic film 50. A film rewind controller 52 operates on a film cassette 54 to generate the relative motion between the recording head 46 and the film 50 necessary for recording. It is necessary for the film to be moving at a relatively constant velocity for recording to take place. If the recording takes place during film rewind, then in this system the film is completely unwound before any exposures are taken, and then "rewound" one frame at a time as each picture is taken. U.S. Pat. No. 5,184,161, which is incorporated herein by reference, describes one way of providing the needed motion. In the case of FIG. 1, the recording section includes the film 50, and the associated product information is also stored on the magnetic portion 48 of the film 50. In the case of a conventional camera unit 14, as shown in FIG. 2, the data read by the magnetic reading head 20 is stored in a short-term buffer 56 and then applied to an output memory 58. The output memory 58 is, e.g., accessed by a host computer (not shown) through an output terminal 60. In the case of FIG. 2, the recording section includes the film 50 and the associated product information is stored in the memory 58.

As shown in FIG. 3, the digital camera 16 captures each image on a charge-coupled device (CCD) 62, digitizes the image in an analog-to-digital (A/D) converter 64, and processes the digital image in a signal processing section 66 for storage in the recording section, which may include an image memory 68, such as internal Flash EEPROM or a removable memory card. In accordance with the invention, the magnetic reading head 20 is contained in an attachment 70 which clips onto a frame 72 that is fastened to the digital camera 16. Data obtained from the magnetic strip 10 is stored in a short-term buffer 74 and transmitted by cable connection 76 between corresponding RS-232 port connectors 78, 80 on the attachment 70 and the camera 16. The data recovered from the magnetic strip 10 is stored in a data memory 82. In accordance with the invention, the logic control unit 32 drives the signal processing section 66 to store the information related to the product in the image memory 68 along with the digital image. An "extra data" bit may also stored to permit a downstream processor to determine that additional product data is included with the image.

Figure 4:
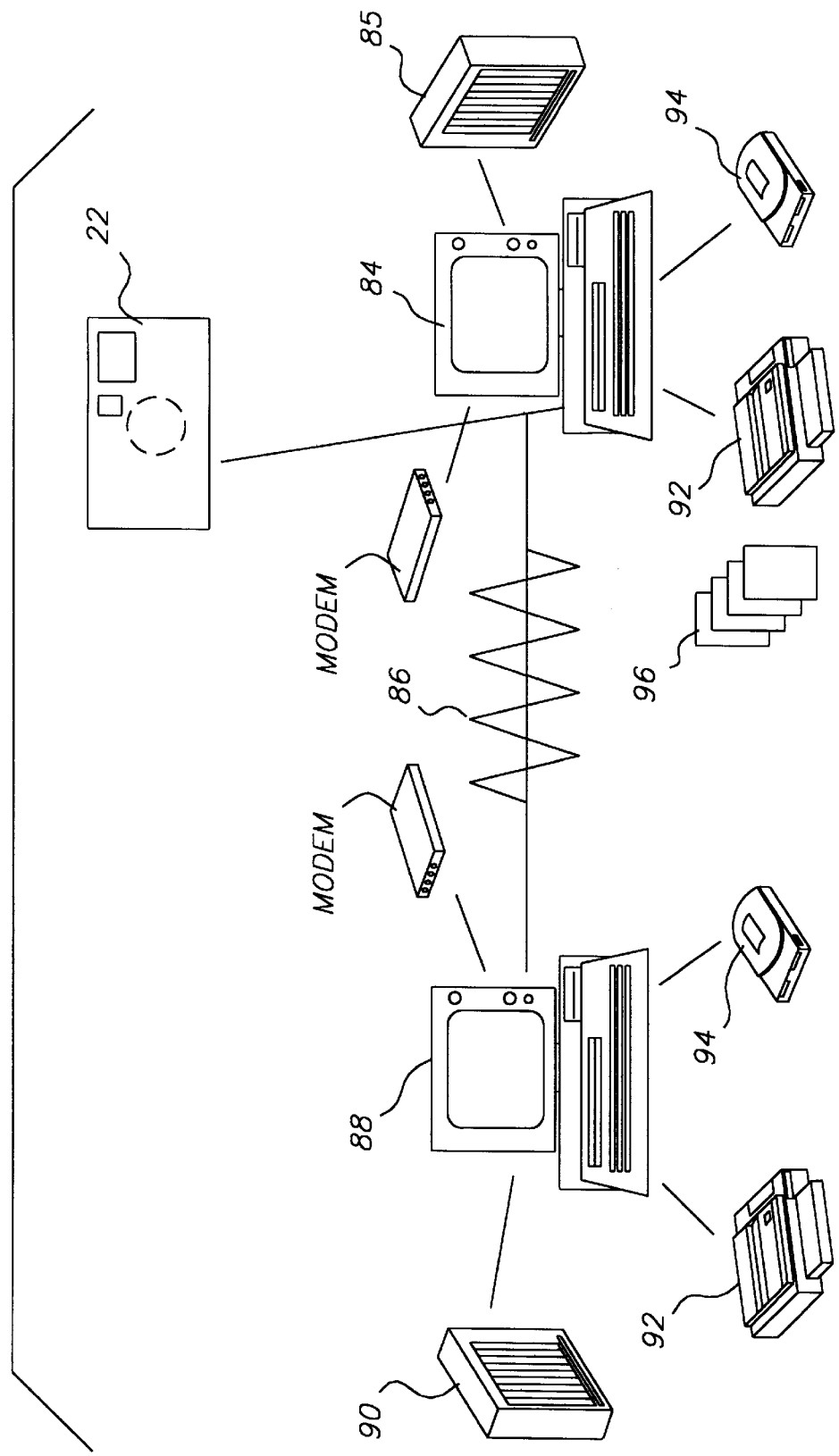
FIG. 4 is a diagram of downstream processing of data captured by a digital camera.

In the digital camera case, as shown in FIG. 4, once the images captured at the tradeshow are downloaded from the camera 16 to a host computer 84 capable of image processing and transmission, the presence of an "extra data" bit in the image record is sensed by the host computer 84, and a telecommunication connection 86 is made to a network server 88 using the URL addresses stored along with the image in the host memory 85. The network server 88 has stored in its memory 90 product information input from the tradeshow booth sponsor. (The product information could likewise be input across the telecommunications connection 86 or by other conventional means.) All the information stored in the network server 88 at the particular URL address is downloaded through the telecommunications connection 86 to the host computer 84 and stored with the image. This information is printed later on using a color printer 92 or stored on removable media 94, such as CD Recordable (CD-R). The tradeshow visitor thus has access to catalog material (e.g., hardcopy 96, or soft copy from the media 94 or a display on the host computer 84) without having to carry the materials from the tradeshow.

Figure 5:
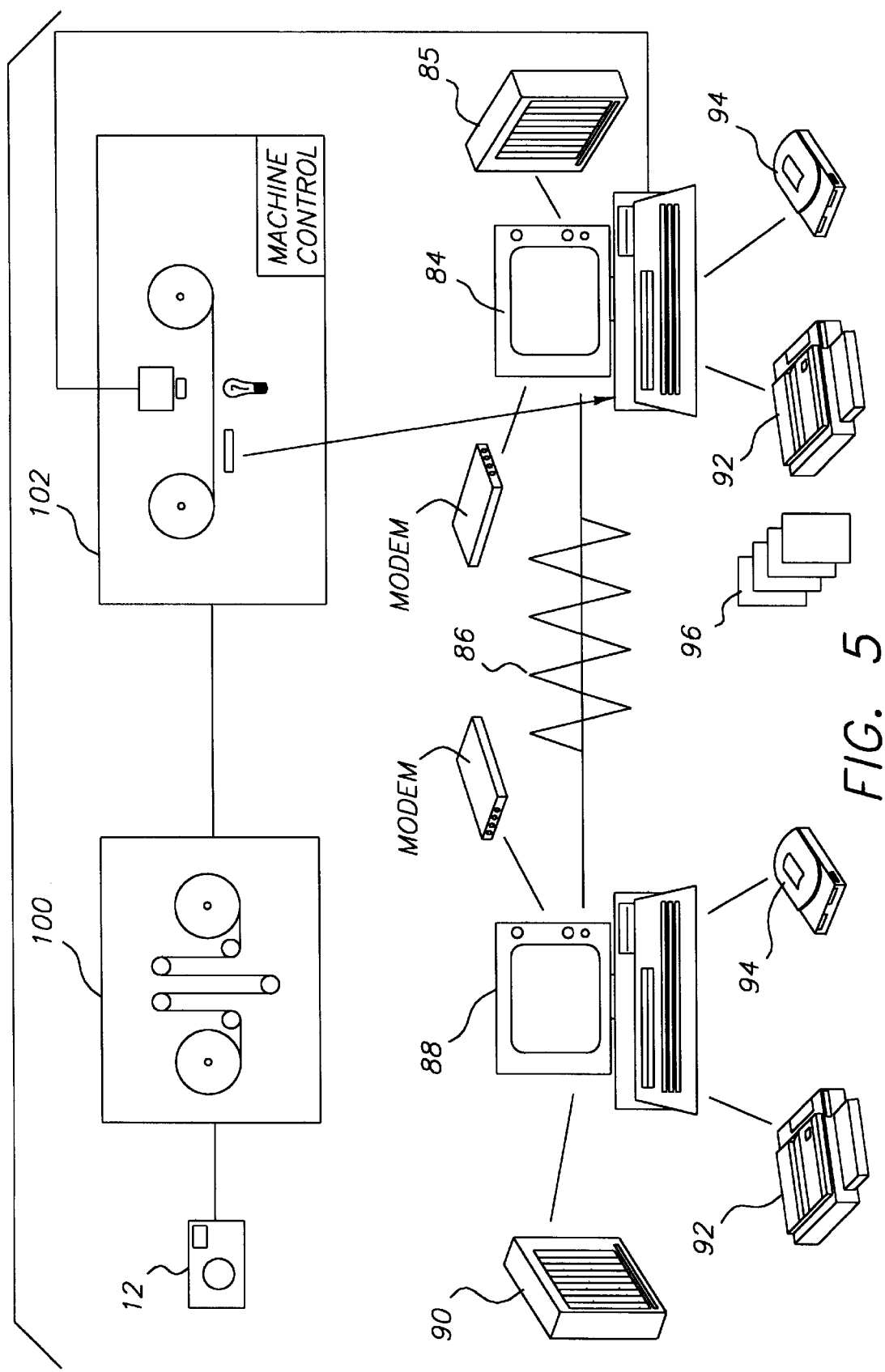
FIG. 5 is a diagram of downstream processing of data captured by a film camera showing photo finishing lab processing, scanning and downloading information stored along with the film.

In the case of the Advanced Photo System™ camera 12, as shown in FIG. 5, the transmitted data is stored on the magnetic portion 48 of the photographic film 50. Once the film is processed in a film processor 100, the developed film is scanned by a film scanner 102. When the film scanner 102 senses the presence of the data stored on the magnetic portion 48 of the film, this data is read by the scanner 102 and downloaded to the host computer 84. Thereafter, the process is similar to that outlined in connection with FIG. 4, i.e., the telecommunication connection 86 is made, and the data at the URL site on the network server 88 is downloaded to the host computer 84. In this case, however, the data may be sent back to the processing station to be printed along with the photographs. In a preferred embodiment, the film scanner 102 also allows for digitization of the images captured on film. This will give the customer the extra benefit of getting the information and images in either hardcopy print format or have it stored on one of many formats of removable media such as CD-R.

Figure 6:
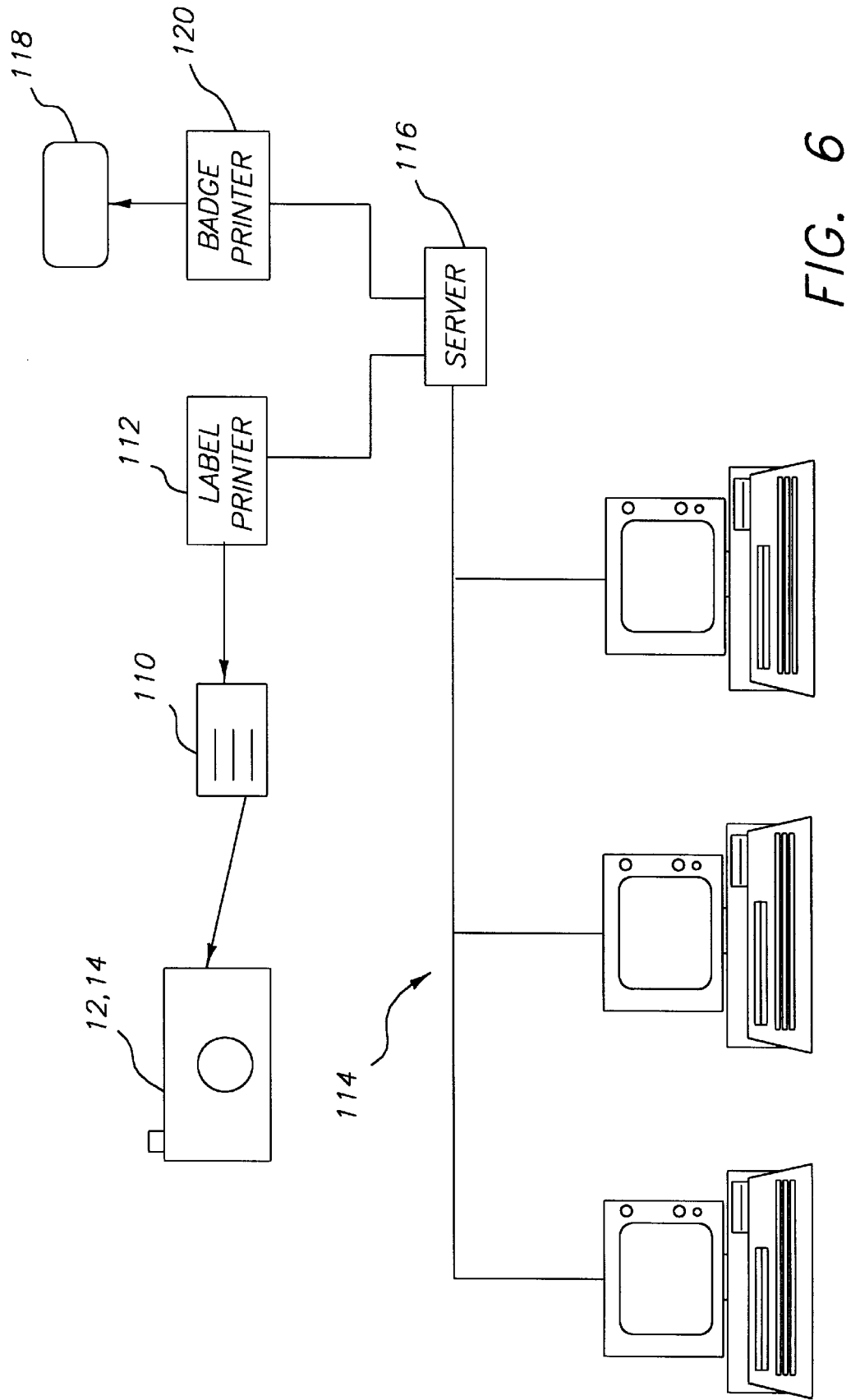
FIG. 6 is a badge printing system to print labels for a single use camera at the tradeshow.

Particularly in a tradeshow environment, the camera may be a single use camera, either of the type using conventional film or using Advanced Photo System™ film. Typically a tradeshow visitor begins the visit at a badge and label printing station. At such a station as shown in FIG. 6, a label 110 is printed up by a label printer 112 from information input from a bank of input terminals 114 connected to a server 116. The label would typically include data about the visitor, such as name and address. (At the same time an identification badge 118 is printed up by a badge printer 120.) The label is then affixed to the single use camera, and the camera is then given to the tradeshow visitor. After the visitor uses the camera to capture images and data associated with the images about specific products, the single use camera is returned to the badge and label printing station. The camera is then sent out, e.g., by the tradeshow organization, for processing and the pictures and the associated information are returned to the tradeshow visitor, e.g., through the mail, using the return address on the label.

In the case of an Advanced Photo System™ single use camera, once the film is processed and scanned by a scanner of the type shown in FIG. 5, the information on the magnetic coating on the film is read. If the information is an address on the Internet, a connection is made through the telecommunications connection 86 to the telecommunications processor 88. The desired information is downloaded and printed alongside the photographs (or on the back of them), or stored alongside the digital version of the images on a piece of removable media such as CD-Recordable. In the case of a conventional film single use camera, once the film is processed, the information stored in the output memory 58 in the camera 14 is downloaded to the photo finishing computer 84 for further action. If the information is an address on the Internet, a connection is made to the telecommunications processor 88. The desired information is downloaded and printed alongside the photographs (or on the back of them), or stored alongside the digital version of the images on a piece of removable media such as CD-Recordable.

In the case of a digital camera, the label and badge printing station may provide the attachment 70 and the frame 72 as an accessory which can be attached to an existing digital camera to read the magnetic information through the magnetic read head 20 and save the information in the camera by transferring it to the image memory 68 on the camera through a standard connection 80 on the camera. After the show, the user returns the accessory to the label and badge printing station, and later downloads the images and information to a personal computer. If the information is an address on the Internet, a connection is made to the telecommunications processor 88. The desired information is downloaded and saved alongside the images on the computer.

The invention has been described with reference to a preferred embodiment. However, it will be appreciated that variations and modifications can be effected by a person of ordinary skill in the art without departing from the scope of the invention.

| | PARTS LIST |
|---|---|
| 10 | magnetic strip |
| 12 | APS film camera |
| 14 | conventional film camera |
| 16 | digital camera |
| 18 | magnetic read section |
| 20 | magnetic reading head |
| 22 | slot |
| 24 | arrow |
| 26 | lens |
| 28 | viewfinder |
| 30 | flash unit |
| 32 | logic control unit |
| 34 | image recording section |
| 36 | user input control section |
| 38 | user input controls |
| 40 | capture release |
| 42 | status display |
| 44 | buffer |
| 46 | magnetic recording head |
| 48 | magnetic portion |
| 50 | APS photographic film |
| 52 | film rewind controller |
| 54 | film cassette |
| 56 | short-term buffer |
| 58 | output memory |
| 60 | output terminal |
| 62 | charge coupled device |
| 64 | A/D converter |
| 66 | signal processing section |
| 68 | image memory |
| 70 | attachment |
| 72 | frame |
| 74 | short-term buffer |
| 76 | cable connection |
| 78 | RS-232 port |
| 80 | RS-232 port |
| 82 | data memory |
| 84 | host computer |
| 86 | telecommunications connection |
| 88 | network server |
| 90 | memory |
| 92 | color printer |
| 94 | removable media |
| 96 | hard copy |
| 100 | film processor |
| 102 | film scanner |
| 110 | label |
| 112 | label printer |
| 114 | input terminals |
| 116 | server |

-continued

PARTS LIST

| 118 | identification badge |
| --- | --- |
| 120 | badge printer |

What is claimed is:

1. A tradeshow photographic and data transmission system for conveying information between a magnetic data unit disposed in a display booth at a tradeshow and a camera brought to the booth by a tradeshow visitor, said magnetic data unit comprising a magnetic strip containing product information about at least one product on display in the tradeshow booth, said camera comprising:

means for capturing an image of one or more products;

means for reading a magnetic signal from the magnetic strip for one or more selected products;

means for storing the read magnetic signal containing product information about the one or more selected products with the images of the products; and a label associated with the camera for identifying the tradeshow visitor whereby photos of the captured images processed at an entry station and related product data can be returned to the tradeshow visitor using data on the label.

2. The tradeshow photographic and data transmission system as claimed in claim 1 wherein the magnetic signal contains an Internet address for accessing further information about the product.

3. The tradeshow photographic and data transmission system as claimed in claim 1 wherein the camera is an electronic camera, the capture means is an electronic sensor, and the storing means is an electronic storage device.

4. The tradeshow photographic and data transmission system as claimed in claim 3 wherein the electronic camera comprises a camera body and an attachment, and the means for reading the magnetic signal is located in the attachment.

5. The tradeshow photographic and data transmission system as claimed in claim 4 wherein the attachment is connected by cable to the camera body.

6. The tradeshow photographic and data transmission system as claimed in claim 1 wherein the camera is a film camera, the capture means is a photographic film having an emulsion for capturing the image and the storing means is a magnetic storage area on the film.

7. The tradeshow photographic and data transmission system as claimed in claim 6 wherein the film camera is a single use camera.

8. A method for conveying information between a magnetic data unit disposed in a display booth at a tradeshow and having a magnetic strip containing product information and a camera brought to the booth by a tradeshow visitor, said method comprising the steps of:

providing the camera to the tradeshow visitor at an entry station, the camera including a magnetic read head for reading the magnetic strip;

providing a label associated with the camera identifying the tradeshow visitor;

storing product data on the magnetic strip of the magnetic data unit about at least one product on display in the tradeshow booth;

capturing images of the products with the camera;

providing relative movement between the camera and the magnetic data unit to read a magnetic signal from the magnetic strip for one or more selected products associated with the captured images;

storing the read magnetic signal containing product data about said one or more selected products with the images of the products; and returning the camera to the entry station for processing whereby processed photos of the captured images and related product data are returned to the tradeshow visitor using the data on the label.

* * * * *